(No Model.)
S. H. ATKINS.
THILL COUPLING.
No. 378,860. Patented Mar. 6, 1888.
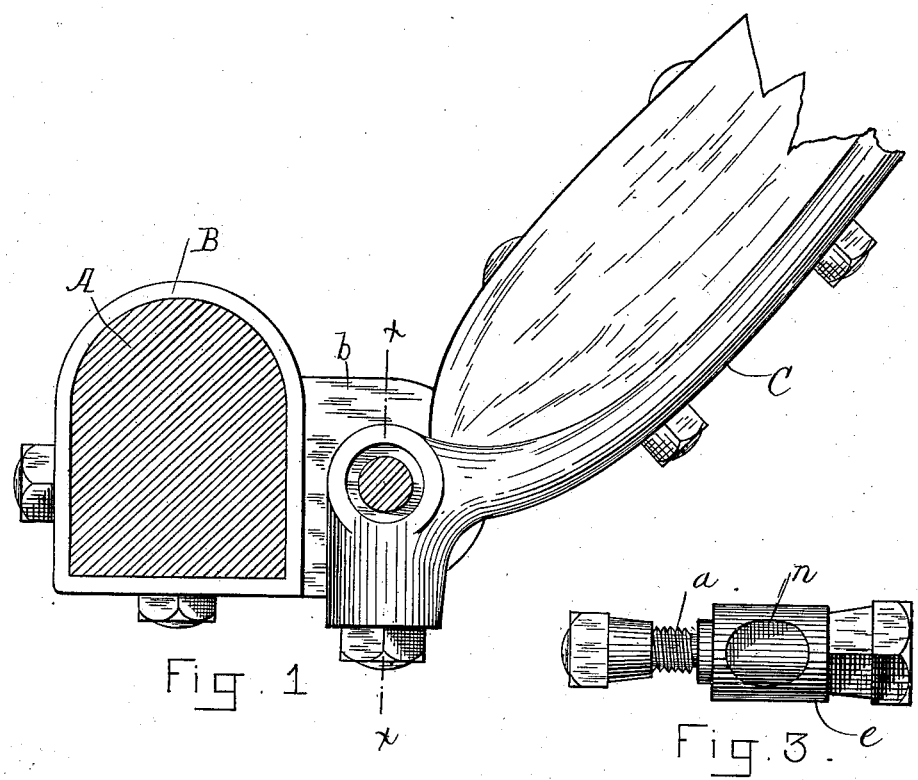
Fig. 1.
Fig. 3.
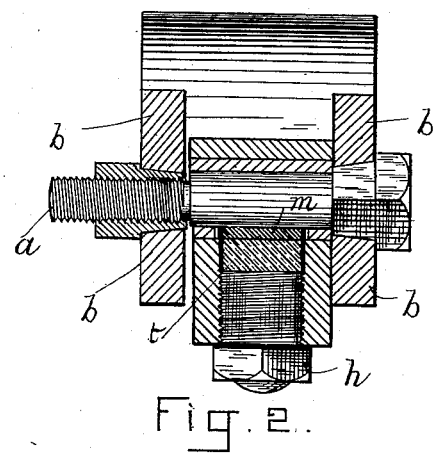
Fig. 2.
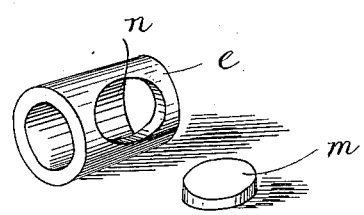
Fig. 4.
WITNESSES.
O. Mayo.
H. P. Silliman.
INVENTOR.
Sullivan H. Atkins.
By C. B. Tuttle
Att'y.

UNITED STATES PATENT OFFICE.

SULLIVAN H. ATKINS, OF LYNN, MASSACHUSETTS.

THILL-COUPLING.

SPECIFICATION forming part of Letters Patent No. 378,860, dated March 6, 1888.

Application filed September 23, 1885. Serial No. 177,899. (No model.)

*To all whom it may concern:*

Be it known that I, SULLIVAN H. ATKINS, of Lynn, in the county of Essex and Commonwealth of Massachusetts, have invented certain Improvements in Thill-Couplings, of which the following, taken in connection with the accompanying drawings, is a specification.

This invention relates to thill-couplings; and it consists in a bushing composed of leatheroid; also in certain details of construction, hereinafter fully described and specifically claimed.

Referring to the accompanying drawings, Figure 1 is a side elevation of a thill-coupling embodying my invention. Fig. 2 is a vertical cross-section on dotted line $x\,x$. Fig. 3 is a detail view of the coupling-bolt and bushing, while Fig. 4 is a detail view of the bushing.

The axle A, clip B, and thill-iron C may be of any suitable and convenient form or construction. That represented in the drawings is the most common. The thill is attached to the axle-clip by means of a coupling-bolt, $a$. Said bolt for this purpose is arranged to pass through the ears $b\,b$ on the clip, and also through the opening in the thill-iron, as fully represented in Figs. 2 and 1. This bolt is surrounded by the bushing $e$, which, when the bolt is in place, lies between the bolt and the walls of the thill-iron, and consequently it receives the wear incident to the movement of the thill when the carriage is in use. This bolt is preferably formed with conical portions on either end—one formed on the shank of the bolt, the other on the nut. These conical portions or shoulders operate to prevent endwise movement of the bolt in its bearings, and further serve to keep the bushing in place on the bolt.

The bushing $e$ is composed of leatheroid, and is molded into the form and size required to fit the bolt and bore in the thill-iron. This leatheroid is very hard, to prevent the sand or dirt from embedding itself therein, yet it is softer than the contiguous iron, and consequently receives the wear incident to the thill-joint. This bushing will glaze or wear smooth, and is both superior to and cheaper than any of the bushings heretofore in use. This bushing is useful, also, in the springs and other parts of carriages where joints are formed similar to thill-joints. This bushing $e$ is represented in the drawings as provided with a hole or opening, $n$. Into this opening is fitted the blank $m$. This blank $m$ is made of hard leather, leatheroid, or some practically non-elastic substance. Metal can be used. It is preferably made about the thickness of the bushing—about three-eighths of an inch. When in position, it bears its inner face upon the coupling-bolt. In the thill-iron is a hole to receive the block $t$ and screw $h$. The block $t$ is made of rubber or some elastic material. It bears one end on the blank $m$ and the other on the inner end of the screw $h$. A suitable turn of the screw $h$ operates to drive inward the blanks $t$ and $m$, so as to cramp the coupling-bolt and prevent any rattling or loose parts.

I am aware that an elastic plunger arranged to be pressed against a coupling-bolt is not new in a thill-coupling; but

I claim as of my invention and desire by Letters Patent to secure—

1. In combination, the bolt $a$, having a plane cylindrical portion, the bushing $e$, surrounding said cylindrical portion and arranged within the thill-iron, said bushing being formed with an opening, as $n$, the blank, as $m$, adapted to be inserted in said opening and to bear upon the bolt, and the screw for applying pressure to said blank, substantially as described.

2. In combination, the bolt $a$, having a plane cylindrical portion, the bushing $e$, surrounding said cylindrical portion and arranged within the thill-iron, said bushing being formed with an opening, as $n$, the blank, as $m$, fitted to said opening, the rubber block arranged upon the outer side of said blank to press it against the bolt, and the screw to act upon the rubber block, substantially as described.

SULLIVAN H. ATKINS.

Witnesses:
O. MAYO,
C. B. TUTTLE.